United States Patent
Liu et al.

(10) Patent No.: US 11,048,416 B2
(45) Date of Patent: Jun. 29, 2021

(54) METHOD, APPARATUS AND COMPUTER PROGRAM PRODUCT FOR MANAGING STORAGE SYSTEM

(71) Applicant: EMC IP Holding Company LLC, Hopkinton, MA (US)

(72) Inventors: Yousheng Liu, Beijing (CN); Xinlei Xu, Beijing (CN); Lifeng Yang, Beijing (CN); Jian Gao, Beijing (CN); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 16/223,736

(22) Filed: Dec. 18, 2018

(65) Prior Publication Data
US 2019/0332296 A1    Oct. 31, 2019

(30) Foreign Application Priority Data
Apr. 28, 2018 (CN) .......................... 201810399624.3

(51) Int. Cl.
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/0689* (2013.01); *G06F 12/0284* (2013.01)

(58) Field of Classification Search
None
See application file for complete search history.

(56) References Cited

U.S. PATENT DOCUMENTS

| | | | | |
|---|---|---|---|---|
| 8,918,392 B1* | 12/2014 | Brooker | .............. | G06F 16/1752 |
| | | | | 707/736 |
| 8,972,694 B1* | 3/2015 | Dolan | ..................... | G06F 13/28 |
| | | | | 711/170 |
| 9,804,939 B1 | 10/2017 | Bono et al. | | |
| 9,842,117 B1* | 12/2017 | Zhou | ..................... | G06F 16/128 |
| 9,864,683 B1 | 1/2018 | Xu et al. | | |
| 10,073,621 B1 | 9/2018 | Foley et al. | | |
| 10,095,425 B1 | 10/2018 | Martin | | |
| 10,120,797 B1 | 11/2018 | Foley et al. | | |
| 10,235,286 B1 | 3/2019 | Yu et al. | | |
| 2012/0089777 A1* | 4/2012 | Agombar | .............. | G06F 3/0689 |
| | | | | 711/114 |

(Continued)

*Primary Examiner* — Ryan Bertram
*Assistant Examiner* — Edmund H Kwong
(74) *Attorney, Agent, or Firm* — BainwoodHuang

(57) ABSTRACT

A storage system is associated with at least one part of multiple storage devices in a resource pool, a part of a storage space in a storage device being inaccessible to the storage system. Techniques involve: identifying an extent within the part of the storage space in the storage device as a free extent; selecting a group of storage devices each with a free extent from the multiple storage devices in response to determining a virtual address range in the storage system as specified by an access request is inaccessible; mapping the virtual address range to a physical address range of the free extents in the group of storage devices; and allocating a storage space specified by the physical address range to the storage system. Therefore, the expansion of the resource pool can be implemented more conveniently and rapidly, and performance of the storage system can be improved.

17 Claims, 11 Drawing Sheets

(56) References Cited

U.S. PATENT DOCUMENTS

2012/0311298 A1\* 12/2012 Post .................. G06F 3/0608
 711/202
2018/0307426 A1\* 10/2018 Sakai .................. G06F 3/0689

\* cited by examiner

METHOD, APPARATUS AND COMPUTER PROGRAM PRODUCT FOR MANAGING STORAGE SYSTEM

BACKGROUND

Various implementations of the present disclosure relate to storage management, and more specifically, to a method, apparatus and computer program product for managing a storage system (e.g. Redundant Array of Independent Disks (RAID)), as well as a computer program product.

With the development of data storage techniques, various data storage devices now provide users with increasingly high data storage capacity, and also their data access speed has been improved greatly. With the increase of data storage capacity, users also impose greater demands on data reliability and response time of storage systems. So far a variety of data storage systems based on redundant arrays of disks have been developed to improve reliability of data. When one or more disks in a storage system fail(s), data in failed disk(s) can be recovered from other normal disk.

Mapped Redundant Array of Independent Disks (mapped RAID) has been developed so far. In the mapped RAID, a disk is a logical concept and may include multiple extents that may be distributed over different physical storage devices in a resource pool. Regarding multiple extents in one stripe of the mapped RAID, they may be distributed over different physical storage devices, so that when a physical storage device where one extent among the multiple extents resides fails, data may be recovered from a physical storage device where other extent resides.

During usage of the storage system, a user might request to allocate more storage space from the resource pool, and a new user might request to allocate storage space from the resource pool so as to create a new storage system. These resource allocation requests might cause spare space in the resource pool to reduce gradually and even be exhausted. At this point, a new storage device needs to be added to the resource pool so as to expand storage space of the resource pool.

An address mapping of the new storage system needs to be updated on the basis of addresses of various extents in the new storage device, so that storage space of the new storage device is available to users of the storage system. However, the address mapping needs to be gradually updated on the basis of addresses of various extents in the new storage device, so users have to wait to use newly expanded storage space in the resource pool until the address mapping update is completed. Therefore, it becomes a technical tough issue regarding how to conveniently and rapidly realize expansion of the resource pool and further improve performance of the storage system.

SUMMARY

Therefore, it is desirable to develop and implement a technical solution for managing a storage system more effectively. It is desired that the technical solution can be compatible with existing storage systems and manage data in existing storage systems more effectively by reconstructing various configurations of these storage systems.

According to a first aspect of the present disclosure, provided is a method for managing a storage system, here the storage system is associated with at least one part of multiple storage devices in a resource pool, and at least one part of a storage space in a storage device among the multiple storage devices is inaccessible to the storage system. The method includes: identifying an extent within the at least one part of the storage space in the storage device as a free extent; selecting a group of storage devices each with a free extent from the multiple storage devices in response to determining a virtual address range in the storage system as specified by an access request is inaccessible; mapping the virtual address range to a physical address range of the free extents in the group of storage devices; and allocating a storage space specified by the physical address range to the storage system.

According to a second aspect of the present disclosure, provided is an apparatus for managing a storage system, the apparatus includes: at least one processor; a volatile memory; and a memory coupled to the at least one processor, the memory having instructions stored thereon, the instructions, when executed by the at least one processor, causing the apparatus to perform acts for managing a storage system. The storage system is associated with at least one part of multiple storage devices in a resource pool, and at least one part of a storage space in a storage device among the multiple storage devices is inaccessible to the storage system. The acts include: identifying an extent within the at least one part of the storage space in the storage device as a free extent; selecting a group of storage devices each with a free extent from the multiple storage devices in response to determining a virtual address range in the storage system as specified by an access request is inaccessible; mapping the virtual address range to a physical address range of the free extents in the group of storage devices; and allocating a storage space specified by the physical address range to the storage system.

According to a third aspect of the present disclosure, provided is a computer program product tangibly stored on a non-transient computer readable medium and including machine executable instructions for executing a method according to the first aspect of the present disclosure.

BRIEF DESCRIPTION OF THE SEVERAL VIEWS OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION

Figure 1A:
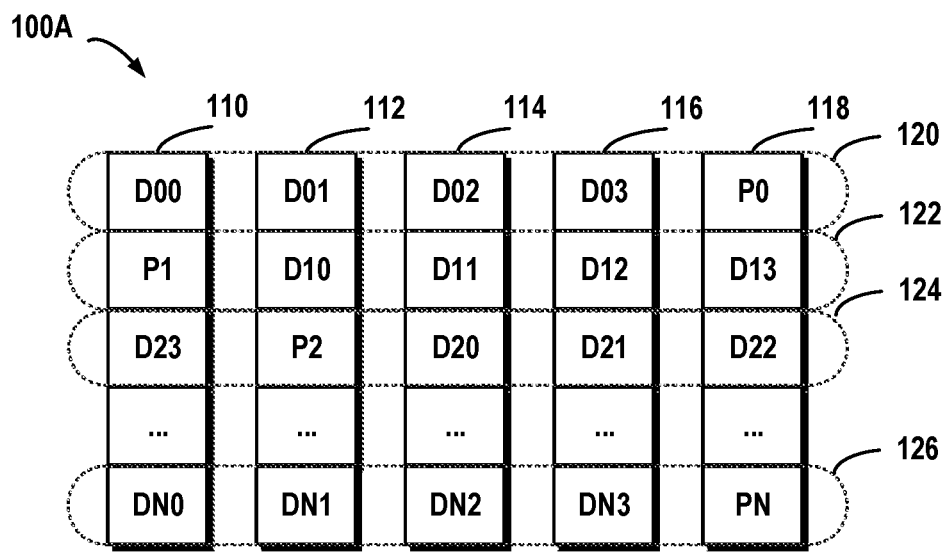
FIGS. 1A and 1B each illustrate a schematic view of a storage system in which a method of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

FIG. 1A schematically illustrates a schematic view of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted although five storage devices are schematically shown in FIG. 1A, in other implementations more or less storage devices may be included according to different levels of RAID. Moreover, although FIG. 1A illustrates stripes 120, 122, 124, . . . , and 126, in other examples the RAID system may further include a different number of stripes.

In RAID, a stripe crosses multiple physical storage devices (for example, the stripe 120 crosses storage the devices 110, 112, 114, 116 and 118). The stripe may be simply construed as a storage area among multiple storage devices which satisfies a given address range. Data stored in the stripe 120 includes multiple parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, and the difference is that the parity about other data block may be stored in other storage device than the storage device 118. In this way, when one of the multiple storage devices 110, 112, 114, 116 and 118 fails, data in the failed device may be recovered from other normal storage devices.

Figure 1B:
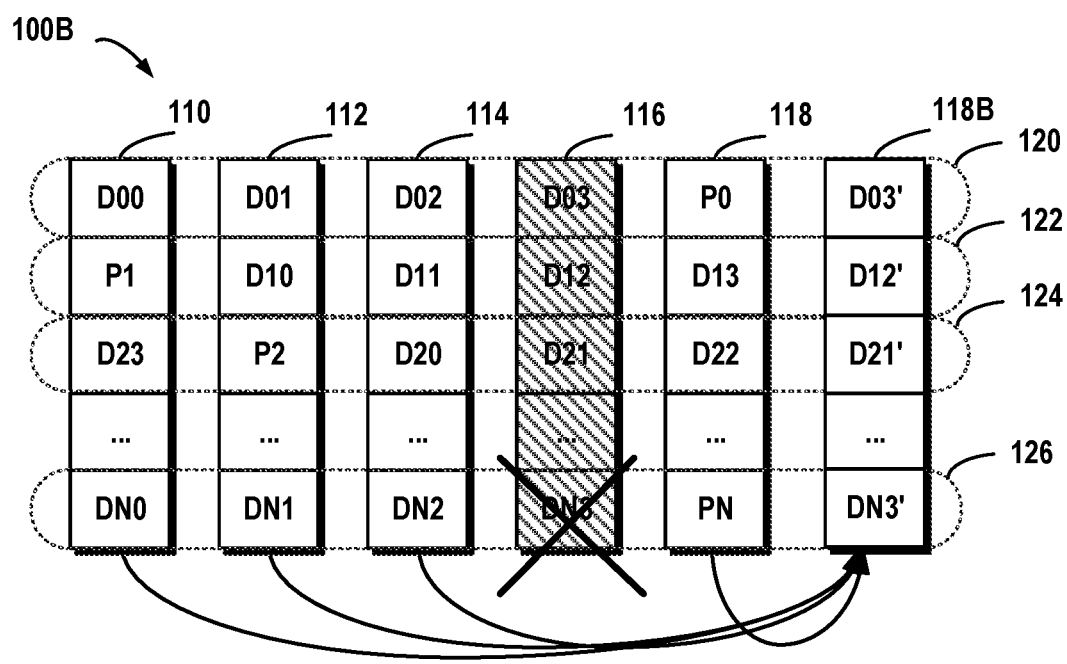

FIG. 1B schematically illustrates a schematic view 100B of rebuilding process of the storage system 100A. As shown in FIG. 1B, when one storage device (e.g. the storage device 116 shown in shades) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Figure 2:
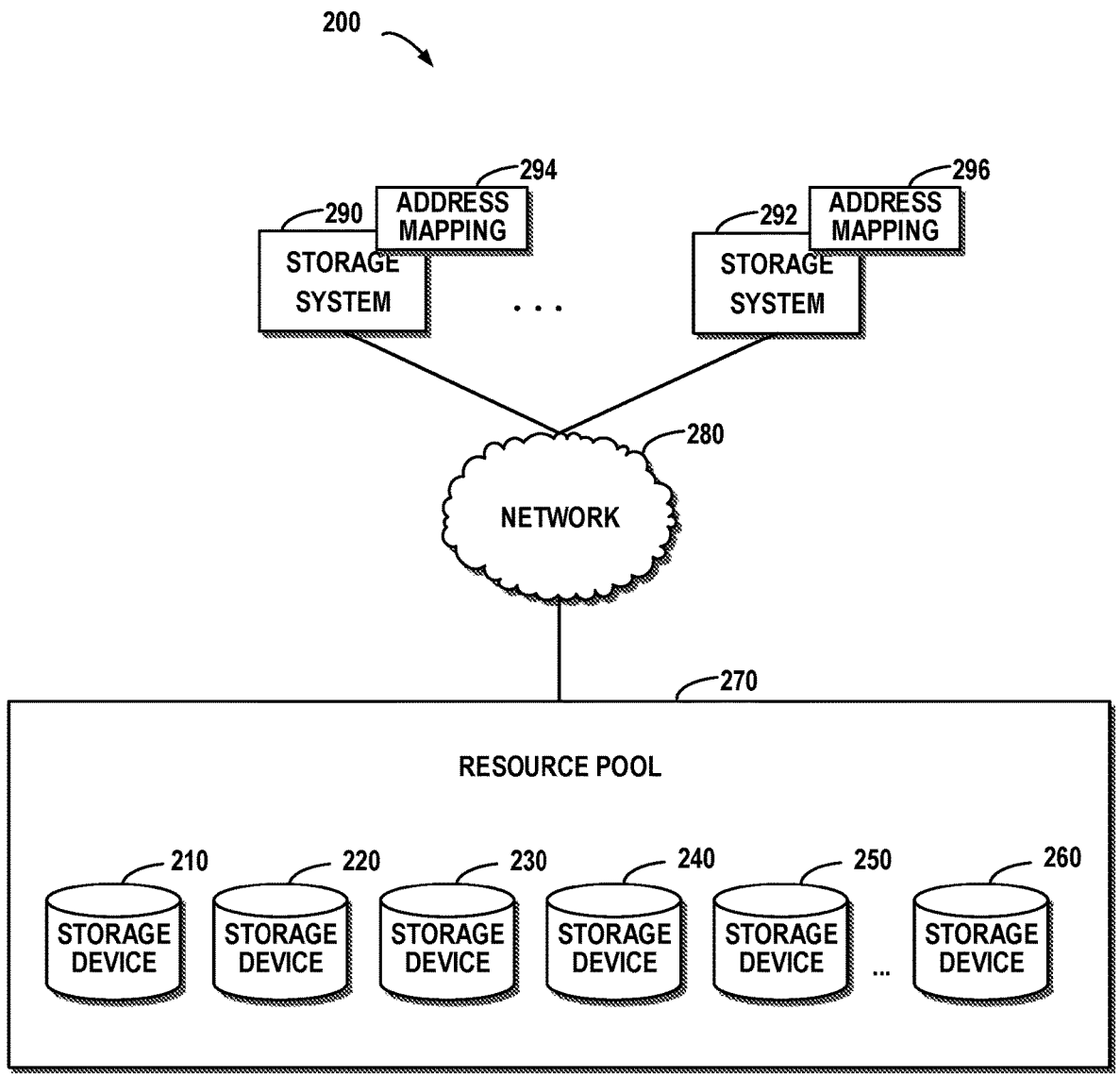
FIG. 2 schematically illustrates a block diagram of an example environment in which a method of the present disclosure may be implemented.

With the development of distributed storage technologies, the various storage devices 110, 112, 114, 116 and 118 in the storage system shown in FIGS. 1A and 1B may be no longer limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment in which the method of the present disclosure may be implemented. As depicted, a storage resource pool 270 may include multiple physical storage devices 210, 220, 230, 240, 250, . . . , 260. At this point, storage space in the multiple storage devices may be allocated to multiple storage systems 290, . . . , 292. At this point, these storage devices 290, . . . , 292 may access the storage space in the various storage devices in the storage resource pool 270 via a network 280.

Figure 3:
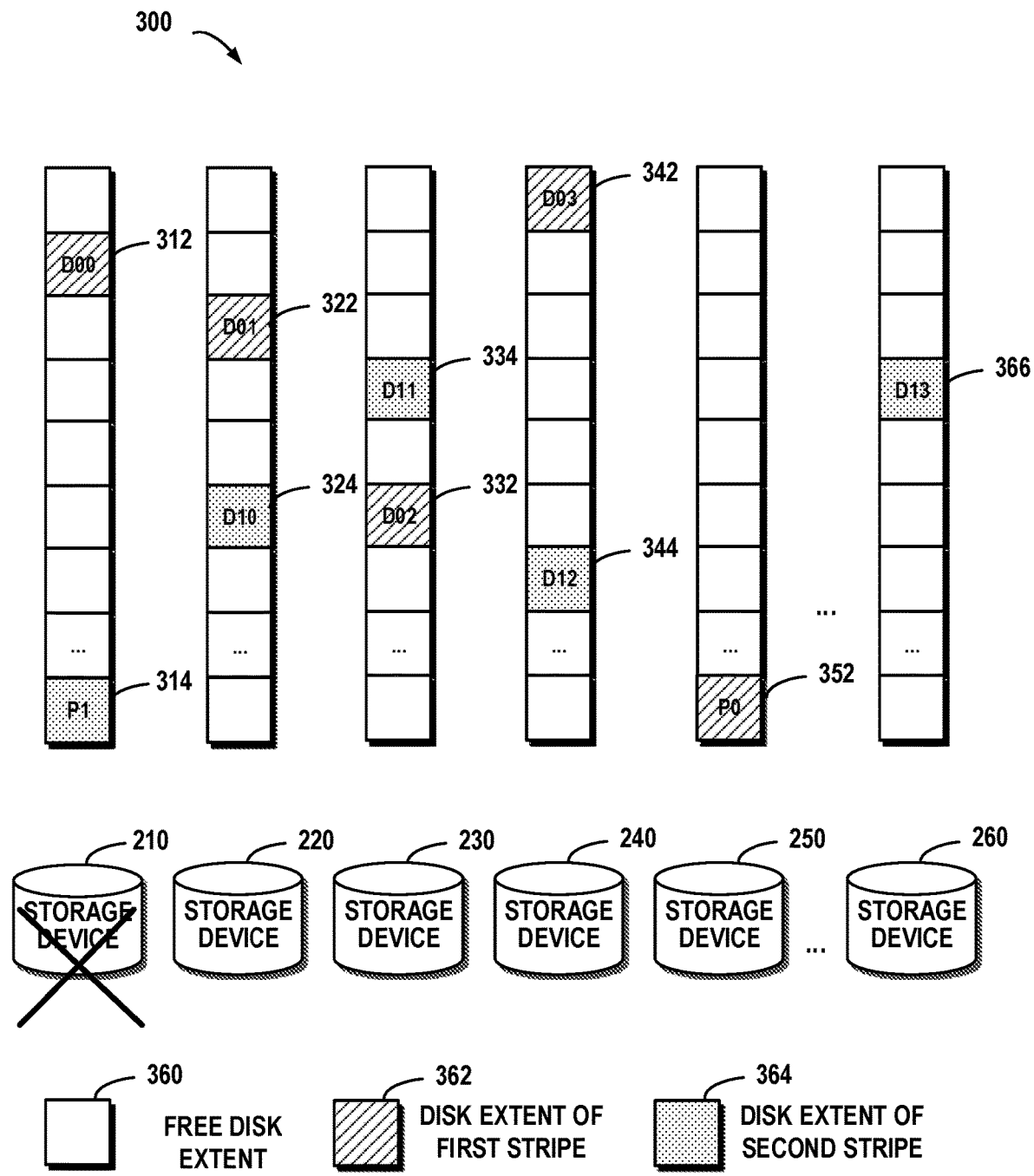
FIG. 3 schematically illustrates a diagram of a storage resource pool in FIG. 2.

FIG. 3 schematically shows a diagram of more information of the storage resource pool 270 as shown in FIG. 2. The resource pool 270 may include multiple storage devices 210, 220, 230, 240, 250, . . . , 260. Each storage device may include multiple extents, for example, a schematic view of extents included in each storage device is shown in the upper portion of the storage device. A blank extent (as shown by a legend 360) represents a free extent, an extent (as shown by a legend 362) shown with slashes represents an extent for a first stripe of the storage system 110A in FIG. 1, and an extent (as shown by a legend 364) shown in shades represents an extent for a second stripe of the storage system 110A in FIG. 1. At this point, extents 312, 322, 332, 342 and 352 for the first stripe are for storing data blocks D00, D01, D02, D03 and parity P0 of the first stripe respectively. Extents 324, 334, 344, 366 and 314 for the second stripe are for storing blocks D10, D11, D12, D13 and parity P1 of the second stripe respectively.

As shown in FIG. 3, there may exist a reserved free portion 370 in each storage device, so that when a storage device in the resource pool fails, extents in the free portion 370 in each storage device may be selected to rebuild various extents in the failed storage device.

Note in FIG. 3 the 4D+1P RAID-5 storage system is taken as an example to illustrate how extents in various stripes are distributed over multiple storage systems in the resource pool. When RAID based on other level is used, those skilled in the art may implement concrete details on the basis of the above described principles. For example, in the 6D+1P+1Q RAID-6 storage system, 8 extents in each stripe may be distributed over multiple storage devices so as to ensure a load balance between the multiple storage devices.

Figure 4:
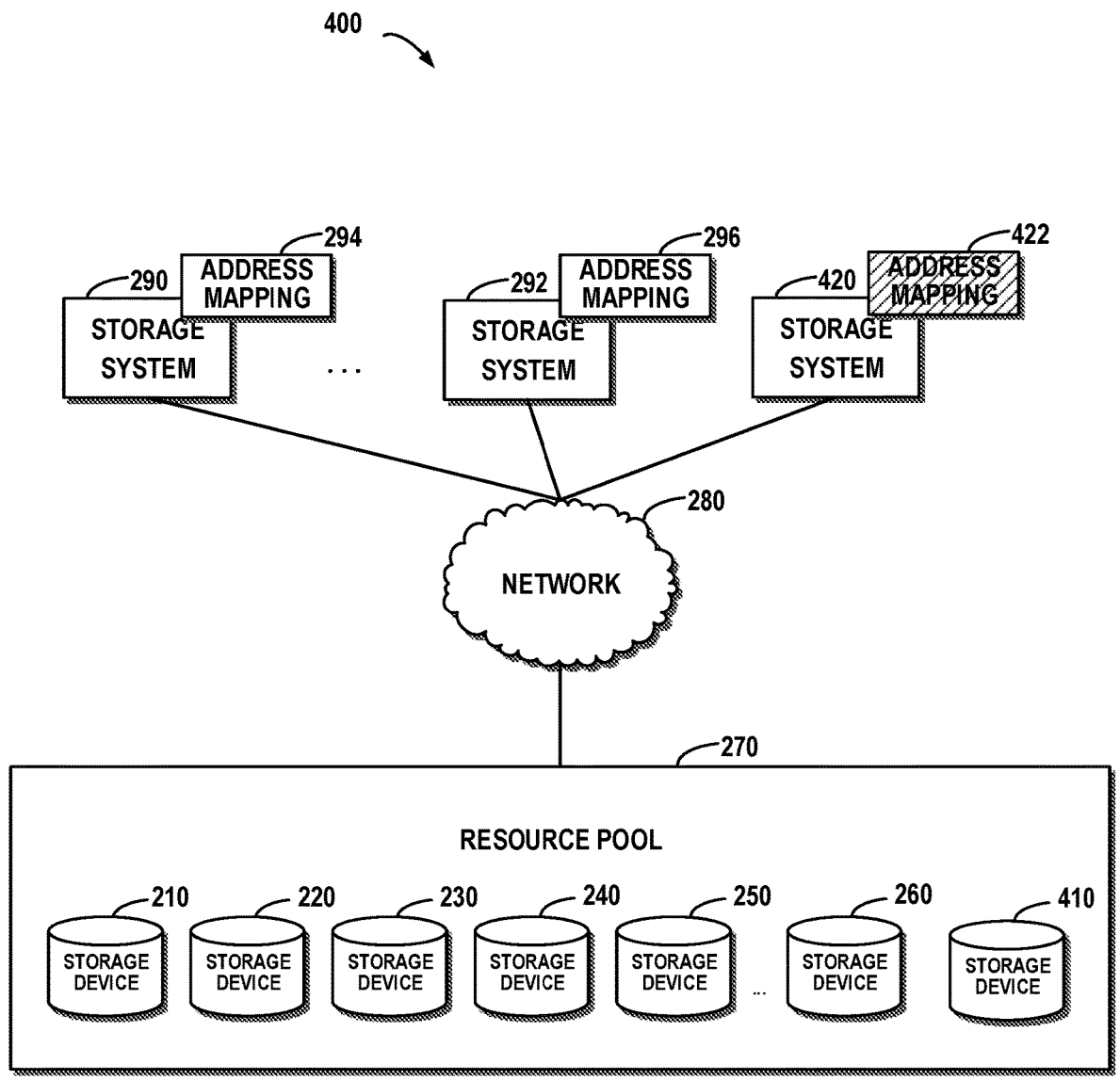
FIG. 4 schematically illustrates an architecture view for managing a storage system according to one implementation of the present disclosure.

It will be understood in order to expand the storage space in the resource pool 270, a new storage device may be added to the resource pool 270. FIG. 4 schematically shows an architecture view 400 for managing a storage system according to one implementation of the present disclosure. FIG. 4 illustrates storage systems 290 and 292, which have address mappings 294 and 296 respectively for recording an address mapping relationship between each storage system and storage devices in the resource pool 270.

Suppose a new storage system 420 needs to be built, when it is found the storage space in the resource pool 270 is insufficient, a new storage device 410 may be added to the resource pool 270 so as to provide storage space to the storage system 420. The storage system 420 may be accessed by means of an address mapping 422. In order to ensure a load balance between various storage devices in the resource pool 270, data in the storage devices 210, 220, 230, 240, 250, . . . 260 may be moved to the new storage device 410, so that the allocated storage space may be distributed in the current resource pool 270 as uniformly as possible. This data moving procedure may be called "shuffle" operation. However, since the address mapping between the storage system and storage devices in the resource pool 270 is not yet finished, users cannot access the storage system.

To solve the foregoing drawbacks, implementations of the present disclosure provide a method, apparatus and program product for managing the storage system 420. Specifically, according to one implementation of the present disclosure, provided is a method for managing the storage system 420. The storage system 420 is associated with at least one part of multiple storage devices in the resource pool 270, and at least one part of the storage space in the storage device 410 among the multiple storage devices is inaccessible to the storage system 420.

As shown in FIG. 4, the storage system 420 is associated with at least one part of the multiple storage devices 210, 220, 230, 240, 250, . . . , 260 and 410 in the resource pool 270. As depicted, the storage device 410 is a newly added storage device during expansion of the resource pool 270, and at least one part of the storage space in a storage device (e.g. the storage device 410) among the multiple storage devices is inaccessible to the storage system 420. At this point, the address mapping 422 between the storage system 420 and various storage devices in the resource pool 270 is not yet built. Therefore, according to traditional technical solutions, users cannot access the storage space in the storage system 420 but have to wait for the address mapping 422 to be built completely.

In this implementation, after the storage device 410 is added to the resource pool 270, extents within the at least part of the storage space in the storage device 410 may be identified as a free extent. At this point, if it is determined a virtual address range in the storage system 420 as specified by an access request is inaccessible, a group of storage devices each having a free extent may be selected from the multiple storage devices. In this implementation, free space may be looked up in the resource pool 270 to respond to the access request, rather than waiting for the shuffle operation of the entire resource pool 270 to be completed.

Next, the virtual address range may be mapped to a physical address range of free extents in the group of selected storage devices, so as to complete building the part of the address mapping 422 that is associated with the access request. Subsequently, the storage space specified by the physical address range is allocated to the storage system 420. With this example implementation, at least one part of the address mapping 422 may be completed on the basis of the free space in the resource pool 270, so that access to the part in the storage system 420 is made possible. In this way, the wait time of users of the storage system 420 may be reduced, and further the performance of the storage system 420 may be improved. It will be understood that in general, when the storage space in the resource pool 270 runs short, one or more new storage devices may be added to the resource pool 270. With the example implementation, the free storage space scattered in the resource pool 270 may be utilized as much as possible to serve access requests and further reduce the wait time.

Figure 5:
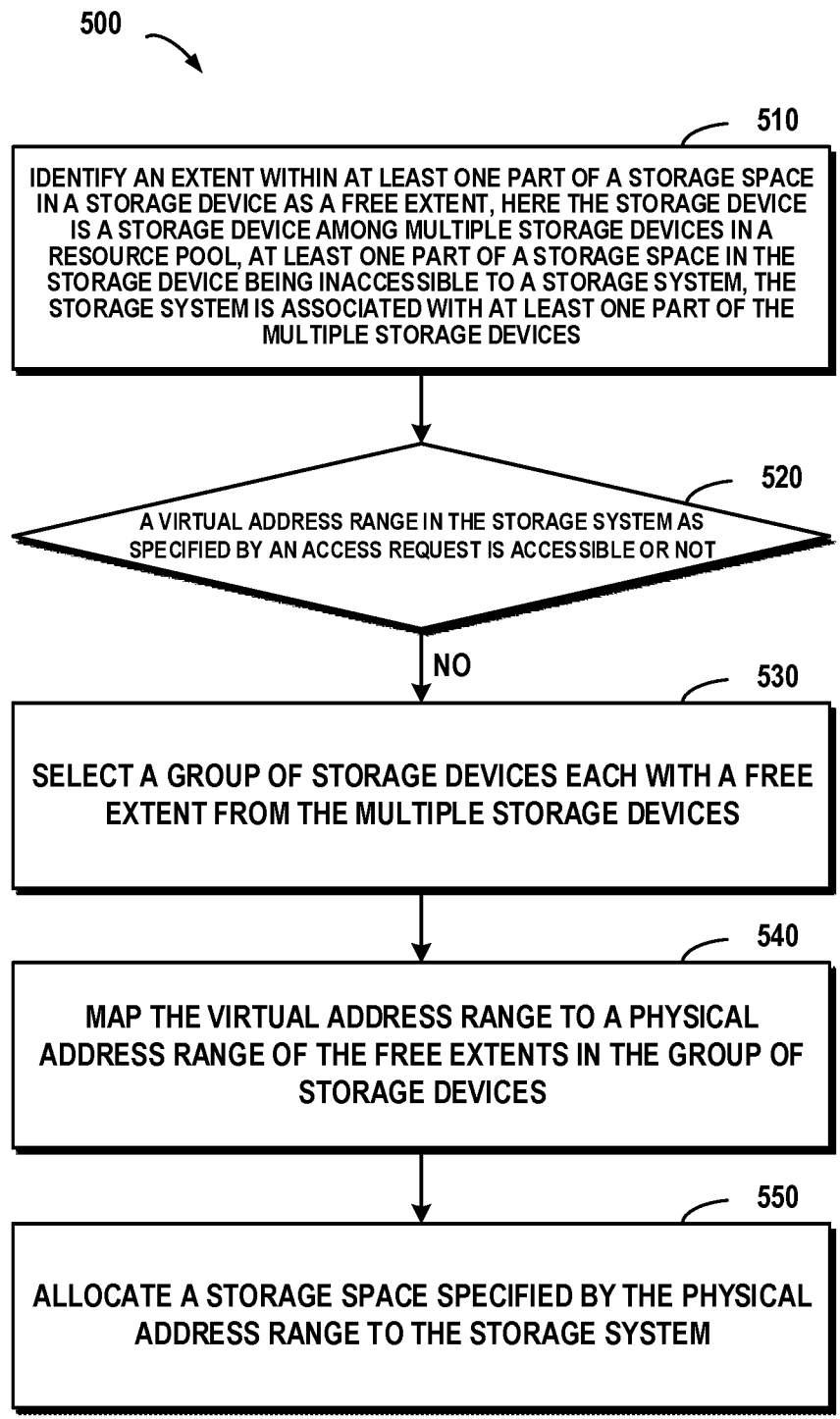
FIG. 5 schematically illustrates a flowchart of a method for managing a storage system according to one implementation of the present disclosure.

FIG. 5 schematically shows a flowchart of a method 500 for managing a storage system according to one implementation of the present disclosure. In a block 510, an extent within at least one part of the storage space in the storage device 410 may be identified as a free extent. It will be understood shuffle operations may run concurrently while the method of the present disclosure is executed. Therefore, the part of the storage space in the storage device 410 might have completed updating the address mapping due to shuffle operations. At this point, the part in the storage device 410 which has undergone shuffle operations has been mapped to other storage systems 290, . . . , 292, and the corresponding address mappings 294 and 296 have been updated. Therefore, the space in the storage device 410 which is not occupied by shuffle operations has not been allocated, so an extent within this part of the storage space may be identified as a free extent.

If an access request with respect to a virtual address range in the storage system 420 is received, it may be determined whether the virtual address range is accessible or not. If not, then the method 500 proceeds to a block 530. In the block 530, a group of storage devices each having a free extent may be selected from the multiple storage devices 210, 220, 230, 240, 250, . . . , 260 and 410. Subsequently, in a block 540, the virtual address range may be mapped to a physical address range of the free extents in the group of selected storage devices. Further, in a block 550, the storage space specified by the physical address range has been allocated to the storage system 420. At this point, since an address mapping has been built for the storage space allocated to the storage system in the block 550, the allocated storage space is accessible to users. In other words, before the address mapping 422 is built completely, one part of storage space in the storage system 420 may provide services to the outside.

According to one example implementation of the present disclosure, the storage system 420 may be a RAID based storage system. At this point, the number of storage devices in the group may be determined on the basis of configuration of the Redundant Array of Independent Disks, and the group of storage devices may be selected from the resource pool 270 depending on the number. It will be understood the RAID based storage system may provide higher reliability by means of data redundancy. Therefore, it should be determined on the basis of concrete configuration of RAID free extents from how many storage devices in the resource pool 270 are selected to build the address mapping.

Figure 6:
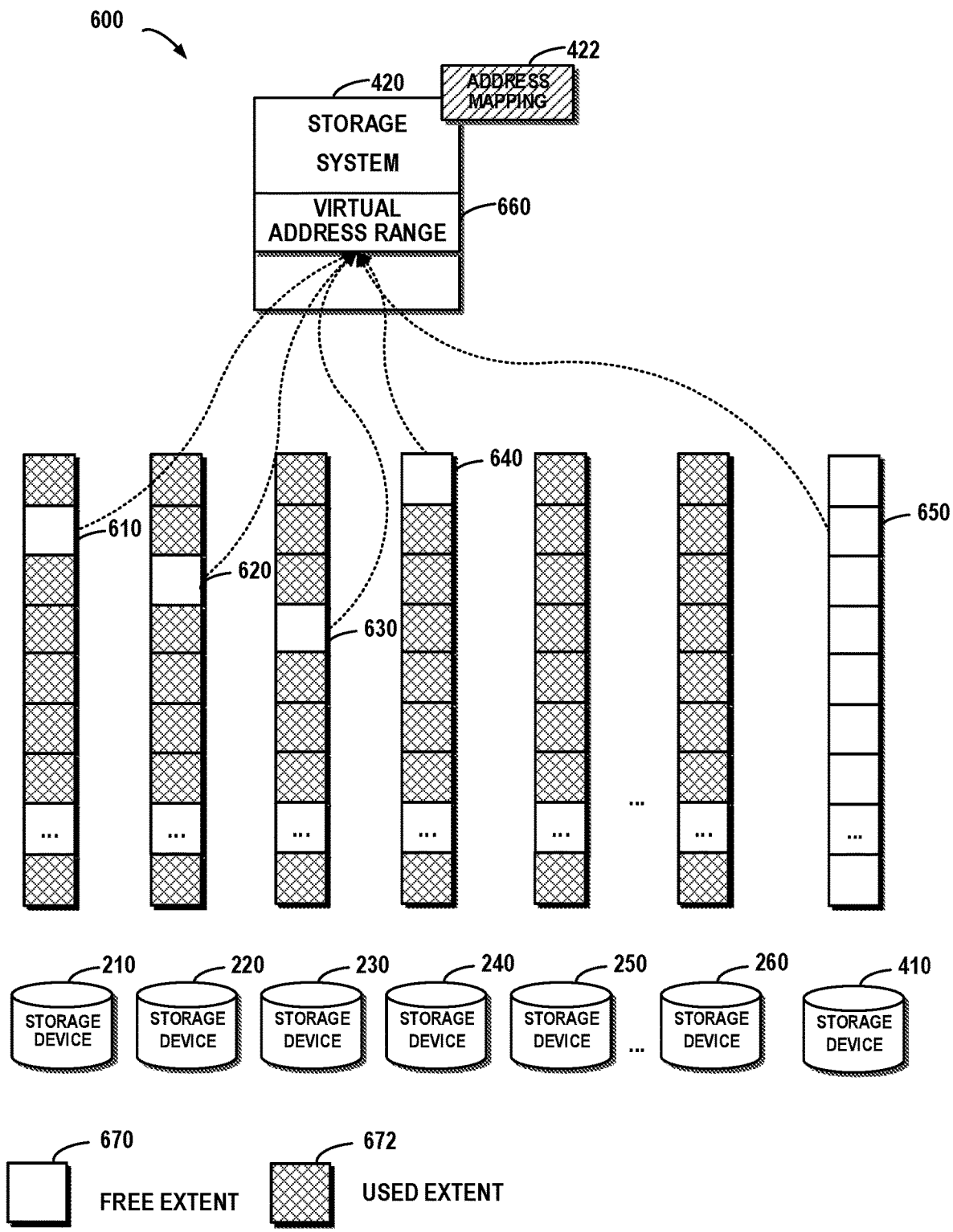
FIG. 6 schematically illustrates a block diagram for selecting from multiple storage devices an extent to be allocated to a storage system according to one implementation of the present disclosure.

Continuing the foregoing example, more information of the present disclosure will be described by taking a 4D+1P storage system as an example. When the storage system 420 is 4D+1P RAID, a free extent may be selected from each of 5 (4+1=5) storage devices. Among the 5 free extents as selected, 4 free extents are for storing data, while 1 free extent is for storing parity associated with data. According to one example implementation of the present disclosure, in a 6D+1P+1Q storage system, free extents may be selected from 8 (6+1+1=8) storage devices. With reference to FIG. 6, description is presented below to more details of how to build an address mapping.

FIG. 6 schematically shows a block diagram 600 for selecting from multiple storage devices extents to be allocated to a storage system according to one implementation of the present disclosure. FIG. 6 illustrates the circumstance where the storage device 410 is just added to the resource pool 270, at which point all extents in the storage device 410 may be identified as free extents. In FIG. 6, a blank extent (as shown by a legend 670) represents a free extent, a grid extent (as shown by a legend 672) represents a used extent. At this point, storage devices including free extents may be selected from the storage devices 210, 220, 230, 240, 250, . . . , 260 and 410.

As show in FIG. 6, the storage devices 210, 220, 230, 240 and 410 include free extents 610, 610, 630, 640 and 650 respectively, so these storage devices and the corresponding extents may be selected to build the address mapping 422. In this implementation, a mapping relationship may be built between spaces of the free extents 610, 620, 630, 640 and 650 and a virtual address range 660, and further these free extents may be allocated to the storage system 420. A mapping relationship between the virtual address range 660 and the various free extents may be recorded in the address mapping 422.

The address mapping 422 may be described in various formats. For example, each free extent may be indicated by a global unique identifier of the free extent. The global unique identifier may be constructed in various ways. According to one example implementation of the present disclosure, regarding the extent 610, the number of the storage device 210 where the extent 610 resides and the position of the extent 610 in the storage device 210 may be used as the identifier. At this point, the identifier of the extent 610 may be ID=(device: 210; position: 2), which represents the extent 610 is the second extent in the device 210. The identifier of other free extent may be determined similarly. For example, the identifier of the extent 620 may be ID= (device: 220; position: 3), which represents the extent 620 is the third extent in the device 220. According to one example implementation of the present disclosure, an identifier may be set for an extent in each storage device in a global unique way.

Since the storage system 420 is a 4D+1P RAID, data may be stored in the free extents 610, 620, 630 and 640, and parity of data may be stored in the free extent 650. In this way, on the one hand, first an address mapping relationship may be built for a part of storage space in the storage device 420, and on the other hand, the reliability of data in the storage system 420 may be guaranteed by providing redundant storage.

According to one example implementation of the present disclosure, the free device number of storage devices including free extents in the resource pool 270 may be determined. If it is determined the free device number meets the number, storage devices including free extents are selected from the multiple storage devices as the group of storage devices. Regarding the storage system 420, if it is determined that the number of storage devices including free extents in the resource pool 270 is larger than or equal to 5, then 5 storage devices including free extents may be selected from the resource pool and then allocated according to the above described procedure.

According to one example implementation of the present disclosure, if it is determined that the free device number does not meet the number, then data in the first extent in a first storage device other than the storage device may be moved to the storage device 410, and the first extent may be identified as a free extent. At this point, the free device number may be increased, and it may be judged whether the current free device number meets the number of extents needed for executing an address mapping. If the current free device number does not meet the needed number, then data in an extent in a further storage device other than the storage device including a free extent may be moved to the storage device 410, so that the resource pool 270 includes more storage devices with free extents.

Figure 7:
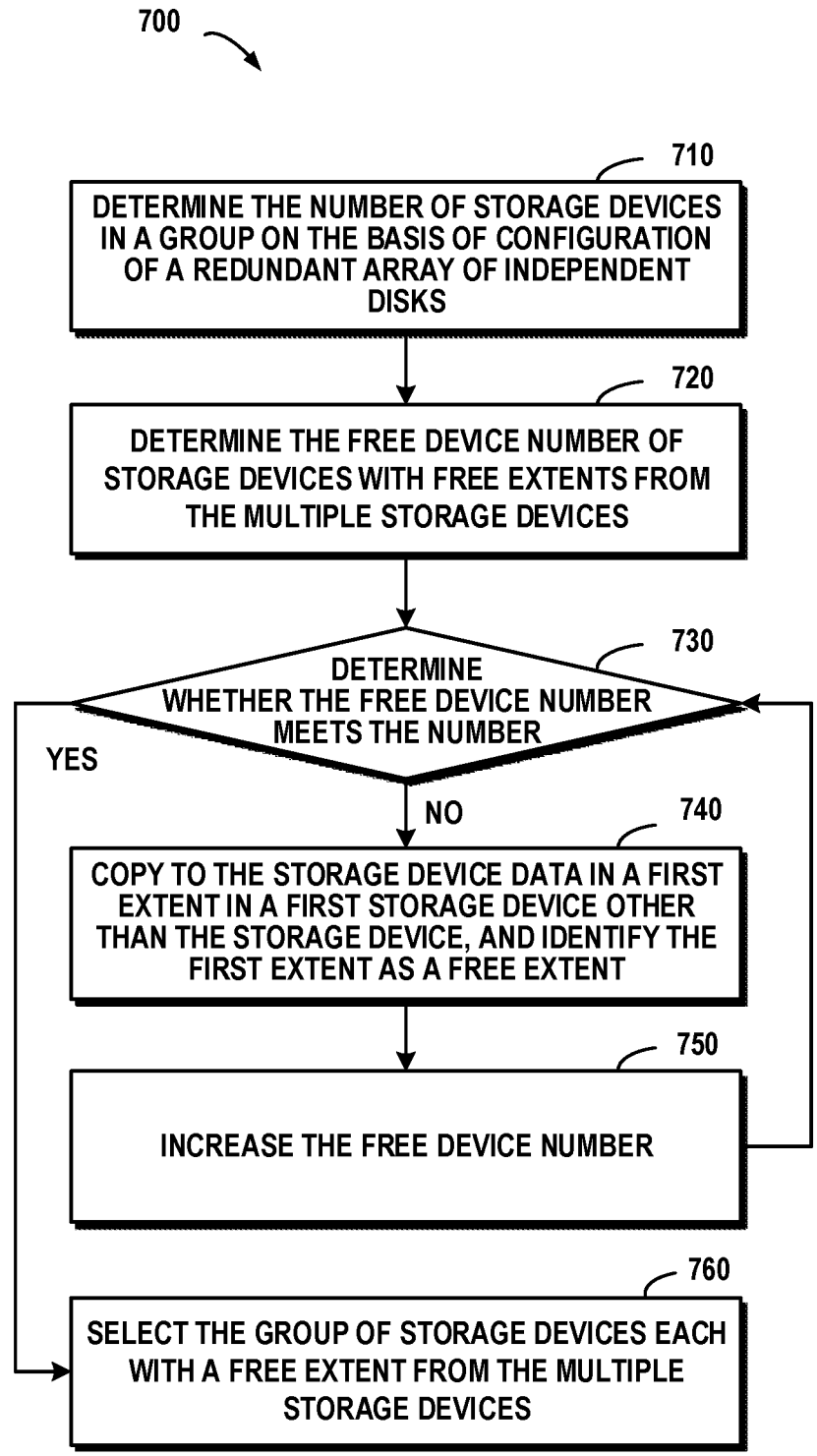
FIG. 7 schematically illustrates a flowchart of a method for allocating a storage space from multiple storage devices to a storage system according to one implementation of the present disclosure.

With reference to FIG. 7, description is presented to more details of the allocation of storage space. FIG. 7 schematically shows a flowchart of a method 700 for allocating storage space from multiple storage devices to the storage system 410 according to one example implementation of the present disclosure. As depicted, in a block 710, the number of storage devices in a group may be determined on the basis of configuration of the RAID. For example, regarding a 4D+1P RAID, the number of storage devices in a group may be 4+1=5; regarding a 4D+1P+1Q RAID, the number of storage devices in a group may be 4+2=6.

In a block 720, the free device number of storage devices including free extents may be determined from a multiple storage devices. In a block 730, if the free device number meets the number, then the method proceeds to a block 760, in which the group of storage devices each including a free extent may be selected from the multiple storage devices. If the free device number does not meet the number, then the method proceeds to a block 740. At this point, a shuffle operation may be performed in the resource pool 270, so that in the resource pool 270 there are more storage device with free extents. In a block 750, the free device number may be increased. For example, the free device number is determined 4 in the block 730; after data in an extent in one storage device is moved to the newly added storage device 410 in the block 740, the free device number will become 4+1=5.

The method returns to the block 730, and it may be judged whether the free device number meets the needed number. At this point, the free device number is updated to 5 and equal to the needed number, so the method proceeds to a block 760. Subsequently, the group of storage devices each having a free extent may be selected from the multiple storage devices.

Figure 8A:
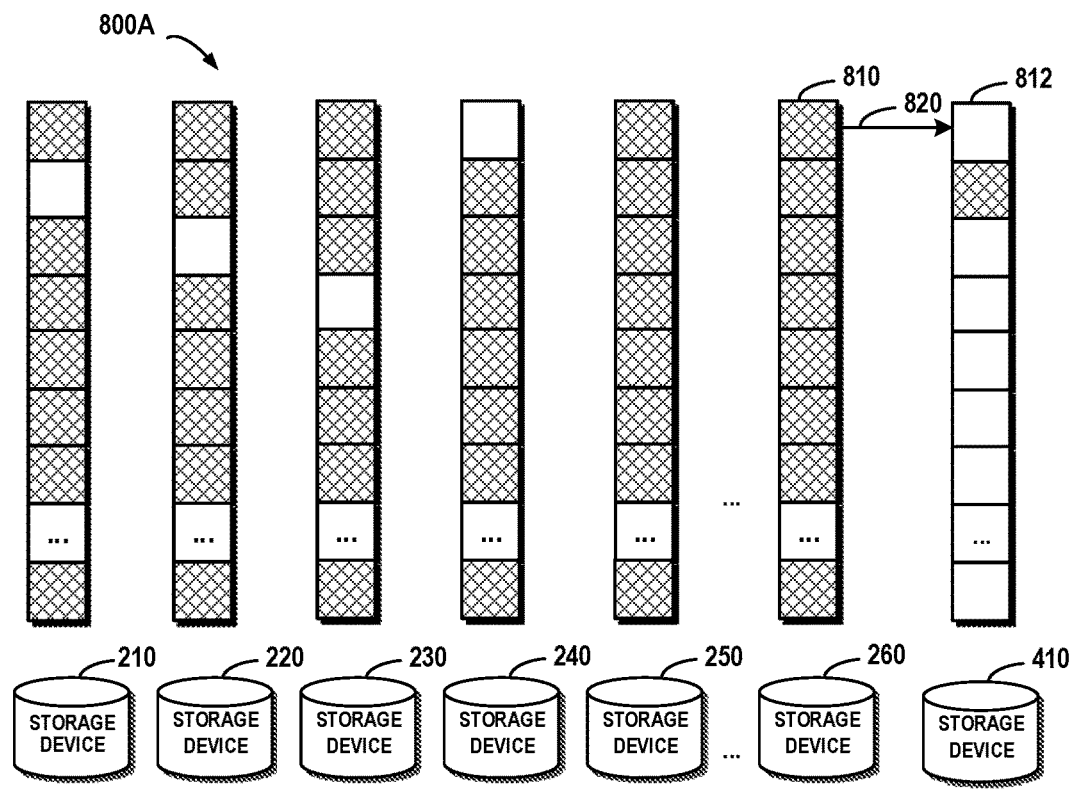
FIGS. 8A and 8B schematically illustrate a block diagram for moving data between multiple storage devices according to one example implementation of the present disclosure.
Figure 8B:
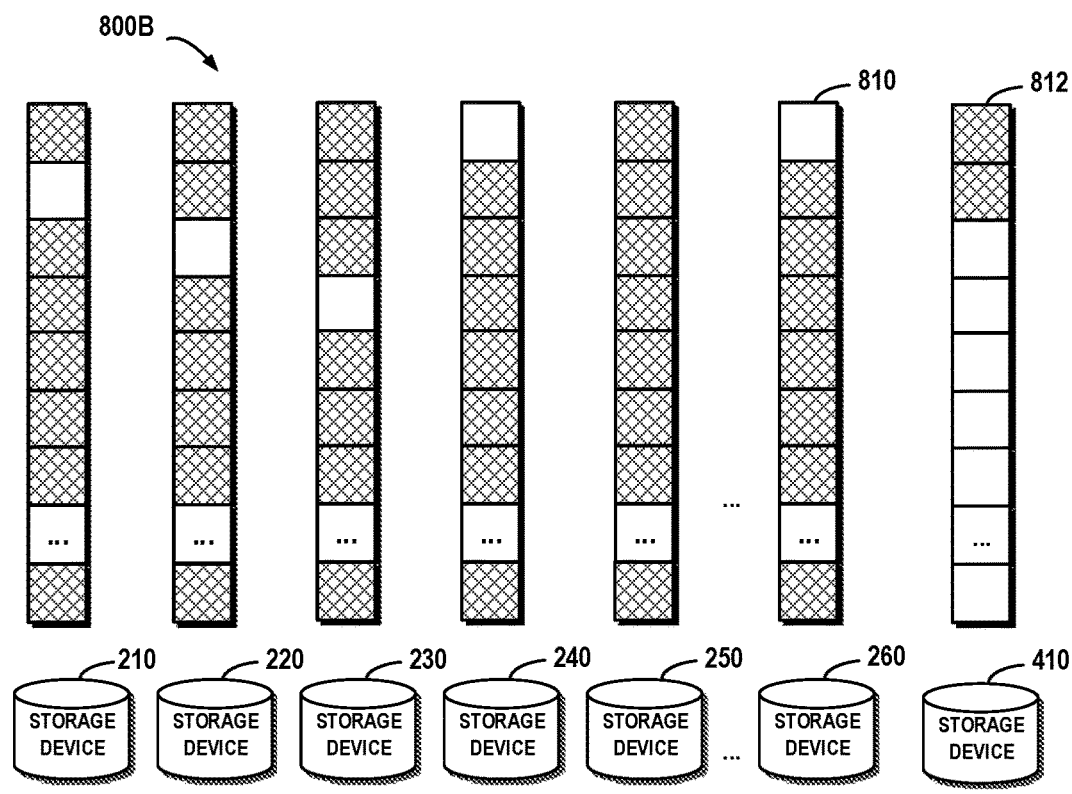

Description has been presented to the implementation in which a data shuffle operation is performed when it is found the number of storage devices including free extents in the resource pool 270 does not meet the needed number. According to one example implementation of the present disclosure, data shuffle operations may be performed concurrently with the above described method 500. In other words, conventional shuffle operations may be performed concurrently, so as to move data in the storage devices 210, 220, 230, 240, 250, . . . , 260 to the newly added storage device 410 in the resource pool 270. By shuffle operations, there are more storage devices including free extents in the resource pool 270, and further storage space may be provided for the address mapping of the storage system 420. With reference to FIGS. 8A and 8B, description is presented below to more details of data move.

FIG. 8A schematically shows a block diagram 800A for moving data between multiple storage devices according to one example implementation of the present disclosure. As shown by an arrow 820 in FIG. 8A, data in an extent 810 in the storage device 260 may be moved to an extent 812 in the storage device 410. FIG. 8B schematically shows a diagram 800B of a state of each storage device after the data move operation shown in FIG. 8A is performed. As shown in FIG. 8B, the extent 810 in the storage device 260 becomes a free extent, while the extent 812 in the storage device 410 is a used extent. Data move operations may be performed continuously, until an allocated portion in the resource pool 270 is uniformly distributed over various storage devices.

With the foregoing example implementation, data in the storage devices 210, 220, 230, 240, 250, . . . , 260 are moved to the newly added storage device 410. As a result, on the one hand, a workload balance may be stricken between various storage devices in the resource pool 270, and on the other hand, more storage space may be provided for the address mapping of the storage system 420.

Figure 9A:
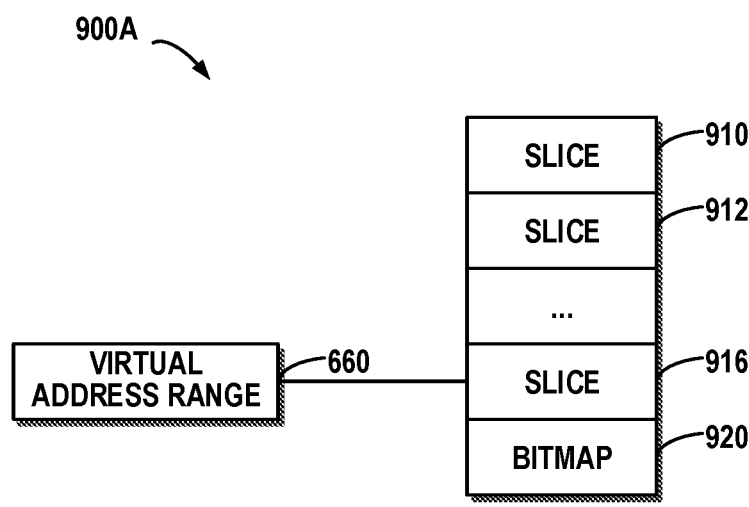
FIG. 9A illustrates a schematic view of a structure of a storage system according to one example implementation of the present disclosure.

According to one example implementation of the present disclosure, the storage system 420 is a RAID based storage system, and the storage system includes multiple slices. FIG. 9A schematically shows a view of a structure 900A of a storage system according to one example implementation of the present disclosure. As depicted, the storage system 420 may include multiple slices, such as slices 910, 912 and 916. Here the slice refers to a storage unit having smaller granularity than an extent in the storage system 420. According to configuration of the storage system 420, the size of the slice may be set to a predefined value. For example, one extent may be divided into multiple slices, and the slice may be used as a unit for responding to a request from a user of the storage system 420. In this way, storage space may be allocated to the user with finer granularity, and further the utilization efficiency of the storage system 420 may be improved.

According to one example implementation of the present disclosure, if a slice access request with respect to a slice among the multiple slices is received, an address range of the slice may be determined on the basis of a slice allocation table of the storage system. Subsequently, the virtual address range 660 may be determined on the basis of the address range of the slice, and storage space for the slice may be selected from the allocated storage space. In this implementation, the allocated storage space may have a larger range, for example, the allocated storage space has a size associated with extents. At this point, storage space suitable for the size of the slice may be selected from the allocated storage space, and the selected storage space may be allocated to the slice.

Figure 9B:
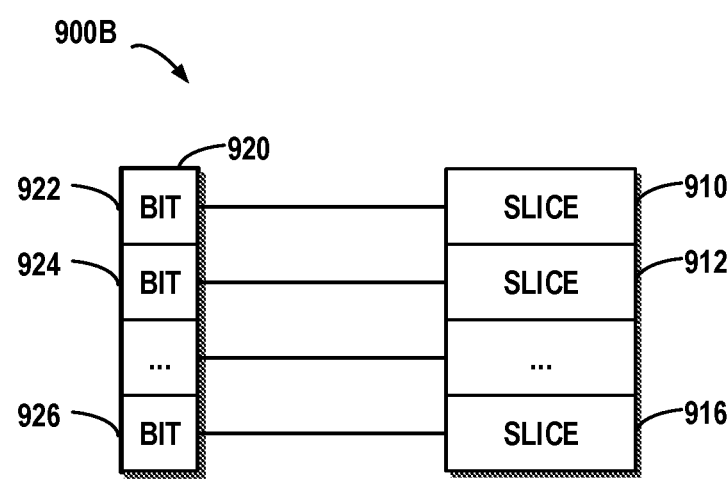
FIG. 9B illustrates a schematic view of a relationship between a slice and a bitmap in a storage system according to one example implementation of the present disclosure.

With the foregoing example implementation, after a slice access request for a slice is received, a storage space may be allocated to the slice. The slice access request will trigger a request for a storage space with a virtual address range that is larger than a slice, and a storage space larger than a slice will be allocated to the storage system 420. At this point, the portion of the allocated storage space which has not been used by the slice may further be allocated to other slice in the storage system 420. In this way, the creation of the address mapping 422 of the storage system 420 may be accelerated, and further the user wait time reduced and the performance of the storage system 420 improved. With reference to FIGS. 9A and 9B, description is presented below to more operation details of a slice.

Still with reference to FIG. 9A, the storage system 420 may further include a bitmap 920 associated with multiple slices 910, 912 and 916. The bitmap 920 may include multiple bits, and the number of bits may be equal to the number of slices included in the storage system 420. A corresponding bit in the bitmap 920 indicates whether data in a corresponding slice among the multiple slices are zero. With reference to FIG. 9B, description is presented below to more details of the bitmap 920.

FIG. 9B schematically shows a view 900B of a relationship between slices and a bitmap in the storage system according to one example implementation of the present disclosure. As depicted, a bit 922 in the bitmap 920 may indicate whether data in the slice 910 are zero; a bit 924 in the bitmap 920 may indicate whether data in the slice 912 are zero; a bit 926 in the bitmap 920 may indicate whether data in the slice 916 are zero. According to one example implementation of the present disclosure, it may be defined that a value "1" represents data in a corresponding slice are zero. According to one example implementation of the present disclosure, it may be further defined that a value "0" represents data in a corresponding slice are zero.

According to one example implementation of the present disclosure, to accelerate the access speed towards the storage system 420, first the bitmap 920 may be accessed to determine whether data in a to-be-accessed slice are zero. If the bitmap 920 indicates data in the slice are zero, then a value in the slice may not be accessed. Therefore, there might exist a case in which a virtual address range corresponding to the bitmap 920 is inaccessible. At this point, a storage space needs to be allocated to the bitmap 920 first. According to one example implementation of the present disclosure, an address of a bitmap associated with the address range of the slice may be determined. Further, with the above described method, a free space in a storage device in the resource pool 270 may be allocated to the bitmap 920.

According to one example implementation of the present disclosure, since the size of the allocated storage space might be far larger than the size of the bitmap 920, a bitmap space may be selected from the allocated storage space so as to store the bitmap 920.

Initially, since the storage system 420 is empty and does not include any data written by users, at this point the bit in the bitmap 920 may be set to indicate data included in the slice are zero. After a write request for a target slice is received, a value of a bit corresponding to the target slice may be updated. According to one example implementation of the present disclosure, if the user access is determined to be a write operation, target data specified by the write operation may be written to the slice, and a bit in the bitmap which is associated with the slice may be set to indicate data in the slice are non-zero. With the foregoing example implementation, after the target data are written to the slice, the bit corresponding to the slice to which data are written may be set to indicate data in the slice are non-zero data.

According to one example implementation of the present disclosure, the storage device 410 is a new storage device that is inserted into the resource pool 270 during expansion of the resource pool 270, and physical addresses of at least one part of a storage space in the new storage device 410 have not been built an address mapping relationship with the storage system. Although the new storage device 410 has been added to the resource pool 270, at this point the space in the storage device 410 is unavailable to the storage system 420. With the foregoing example implementation, the address mapping 422 may be created for a part of the storage system 420 by means of a free space in the resource pool 270. In this way, the time for which the user has to wait for the storage system 420 to complete the address mapping operation may be reduced, and further the performance of the storage system 420 may be improved.

According to one example implementation of the present disclosure, a slice access request for each slice among the multiple slices may be generated in the order of the multiple slices in the storage system 420. With the foregoing example implementation, on the one hand, preferentially a storage space may be allocated to the accessed slice according to the access request; on the other hand, a storage space may be allocated to each slice one by one, and further spaces are allocated to all slices in the storage system 420.

Figure 10:
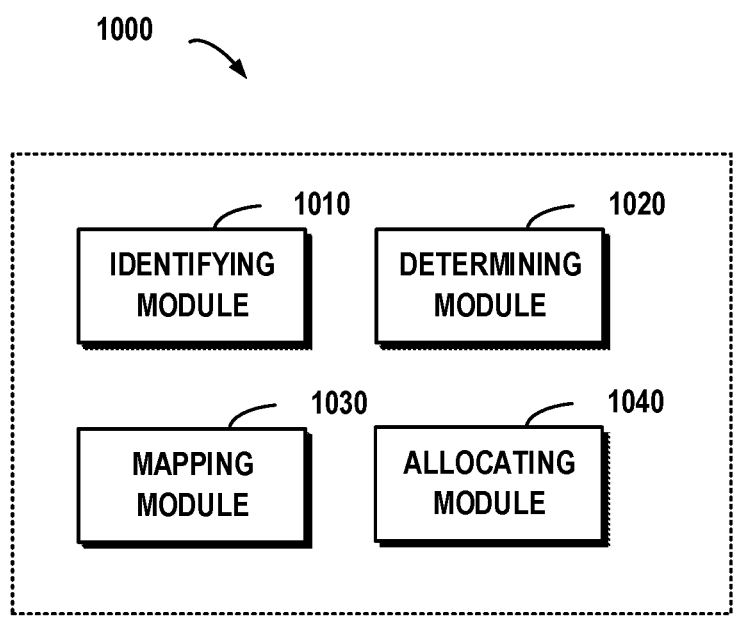
FIG. 10 schematically illustrates a block diagram of an apparatus for managing a storage system according to one example implementation of the present disclosure.

While examples of the method according to the present disclosure have been described in detail with reference to FIGS. 4 to 9B, implementations of a corresponding apparatus will be described below with reference to FIG. 10. FIG. 10 schematically shows a block diagram of an apparatus 1000 for managing a storage system according to one example implementation of the present disclosure. The storage system is associated with at least one part of multiple storage devices in a resource pool, and at least one part of a storage space in a storage device among the multiple storage devices is inaccessible to the storage system. Specifically, the apparatus 1000 includes: an identifying module 1010 configured to identify an extent within the at least one part of the storage space in the storage device as a free extent; a selecting module 1020 configured to select a group of storage devices each with a free extent from the multiple storage devices in response to determining a virtual address range in the storage system as specified by an access request is inaccessible; a mapping module 1030 configured to map the virtual address range to a physical address range of the free extents in the group of storage devices; and an allocating module 1040 configured to allocate a storage space specified by the physical address range to the storage system. Here the apparatus 1000 may be configured to execute various steps in the method 500 described above, and details of which is ignored.

Figure 11:
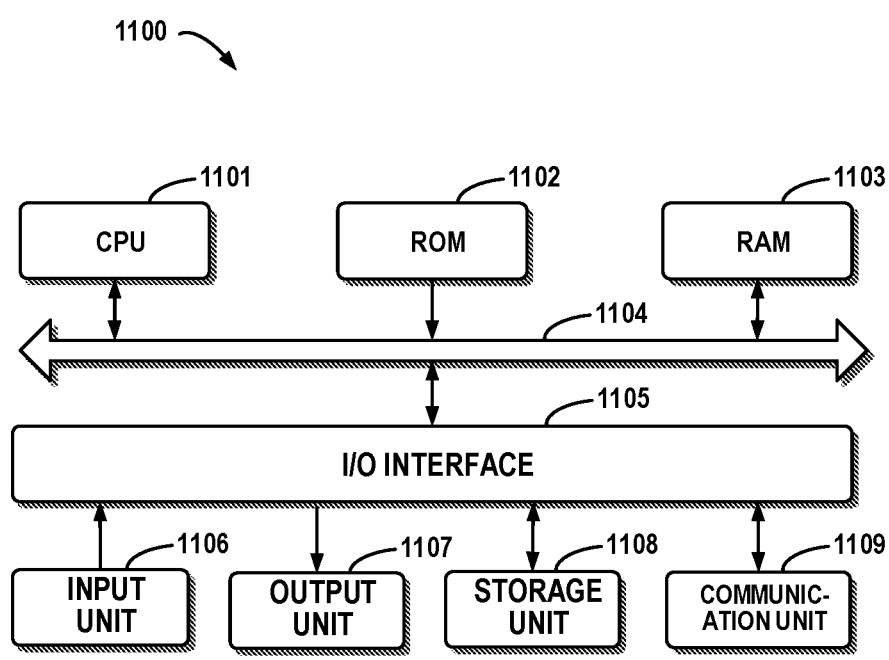
FIG. 11 schematically illustrates a block diagram of an apparatus for managing a storage system according to one example implementation of the present disclosure.

FIG. 11 schematically shows a block diagram of an apparatus 1100 for managing a storage system according to one example implementation of the present disclosure. As depicted, the apparatus 1100 includes a central process unit (CPU) 1101, which can execute various suitable actions and processing based on the computer program instructions stored in the read-only memory (ROM) 1102 or computer program instructions loaded in the random-access memory (RAM) 1103 from a storage unit 1108. The RAM 1103 can also store all kinds of programs and data required by the operations of the apparatus 1100. CPU 1101, ROM 1102 and RAM 1103 are connected to each other via a bus 1104. The input/output (I/O) interface 1105 is also connected to the bus 1104.

A plurality of components in the apparatus 1100 is connected to the I/O interface 1105, including: an input unit 1106, such as keyboard, mouse and the like; an output unit 1107, e.g., various kinds of display and loudspeakers etc.; a storage unit 1108, such as magnetic disk and optical disk etc.; and a communication unit 1109, such as network card, modem, wireless transceiver and the like. The communication unit 1109 allows the apparatus 1100 to exchange information/data with other devices via the computer network, such as Internet, and/or various telecommunication networks.

The above described each process and treatment, such as the method 500, can also be executed by the processing unit 1101. For example, in some implementations, the method 500 can be implemented as a computer software program tangibly included in the machine-readable medium, e.g., the storage unit 1108. In some implementations, the computer program can be partially or fully loaded and/or mounted to the apparatus 1100 via ROM 1102 and/or the communication unit 1109. When the computer program is loaded to the RAM 1103 and executed by the CPU 1101, one or more steps of the above described method 500 can be implemented. Alternatively, in other implementations, the CPU 1101 also can be configured in other suitable manners to realize the above procedure/method.

According to one example implementation of the present disclosure, there is provided an apparatus for managing a storage system, the apparatus including: at least one processor; a volatile memory; and a memory coupled to the at least one processor, the memory having instructions stored thereon, the instructions, when executed by the at least one processor, causing the apparatus to perform acts for managing a storage system. The storage system is associated with at least one part of multiple storage devices in a resource pool, at least one part of a storage space in a storage device among the multiple storage devices being inaccessible to the storage system, the acts include: identifying an extent within the at least one part of the storage space in the storage device as a free extent; selecting a group of storage devices each with a free extent from the multiple storage devices in response to determining a virtual address range in the storage system as specified by an access request is inaccessible; mapping the virtual address range to a physical address range of the free extents in the group of storage devices; and allocating a storage space specified by the physical address range to the storage system.

According to one example implementation of the present disclosure, the storage system is a storage system based on a Redundant Array of Independent Disks, wherein selecting a group of storage devices each with a free extent from the multiple storage devices includes: determining the number of storage devices in the group on the basis of configuration of the Redundant Array of Independent Disks; and selecting the group of storage devices on the basis of the number.

According to one example implementation of the present disclosure, selecting the group of storage devices on the basis of the number includes: determining the free device number of storage devices with free extents from the multiple storage devices; and in response to determining the free device number meets the number, selecting devices storage devices with free extents as the group of storage devices from the multiple storage.

According to one example implementation of the present disclosure, selecting the group of storage devices on the basis of the number further includes: in response to determining the free device number does not meet the number, moving to the storage device data in a first extent in a first storage device other than the storage device; identifying the first extent as a free extent; and increasing the free device number.

According to one example implementation of the present disclosure, the acts further include: moving to the storage device data in a first extent in a first storage device other than the storage device; and identifying the first extent as a free extent.

According to one example implementation of the present disclosure, the storage system is a storage system based on a Redundant Array of Independent Disks, the storage system including multiple slices, the method further including: in response to receiving a slice access request for a slice among the multiple slices, determining an address range of the slice on the basis of a slice allocation table of the storage system; determining the virtual address range on the basis of the address range of the slice; and wherein allocating a storage space specified by the physical address range to the storage system includes: selecting a storage space for the slice from the allocated storage space.

According to one example implementation of the present disclosure, determining the virtual address range on the basis of the address range of the slice includes: determining an address of a bitmap associated with the address range of the slice, a corresponding bit in the bitmap indicating whether data in a corresponding slice among the multiple slices are zero; and determining the virtual address range on the basis of the address of the bitmap.

According to one example implementation of the present disclosure, the acts further include: selecting a bitmap space for storing the bitmap from the allocated storage space; and in response to determining the user access is a write operation, writing target data specified by the write operation to the slice; and setting a bit in the bitmap, which is associated with the slice, to indicate data in the slice are non-zero.

According to one example implementation of the present disclosure, the storage device is a new storage device that is inserted into the resource pool during expansion of the resource pool; and a physical address of at least one part of a storage space in the new storage device has not built an address mapping relationship with the storage system.

According to one example implementation of the present disclosure, the acts further include: generating a slice access request for each slice among the multiple slices.

According to one example implementation of the present disclosure, there is provided a computer program product. The computer program product is tangibly stored on a computer readable medium and includes machine executable instructions which, when executed, cause a machine to implement the method according to the present disclosure.

According to one example implementation of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

The invention claimed is:

1. A method for managing a storage system, the storage system being associated with at least one part of multiple storage devices in a resource pool, at least one part of a storage space in a storage device among the multiple storage devices being inaccessible to the storage system, wherein the storage system is a storage system based on a Redundant Array of Independent Disks, the storage system comprising multiple slices, the method comprising:
    identifying an extent within the at least one part of the storage space in the storage device that is inaccessible to the storage system as a free extent when the storage device is added to the storage pool during an expansion of the storage pool, wherein the extent is inaccessible to the storage system because a mapping between the storage system and the storage device is not completely built;
    in response to receiving a slice access request for a slice among the multiple slices, determining an address range of the slice on the basis of a slice allocation table of the storage system;
    determining a virtual address range in the storage system on the basis of the address range of the slice, at least in part by
    determining an address of a bitmap associated with the address range of the slice, a corresponding bit in the bitmap indicating whether data in a corresponding slice among the multiple slices are zero, and
    determining the virtual address range on the basis of the address of the bitmap;
    selecting a group of storage devices each with a free extent from the multiple storage devices in response to determining that the virtual address range in the storage system is inaccessible;
    mapping the virtual address range to a physical address range of the free extents in the group of storage devices; and
    allocating a storage space specified by the physical address range to the storage system and selecting a storage space for the slice from the allocated storage space;
    wherein each of the multiple slices comprises a storage unit having a size equal to a predefined value that is smaller than each of the multiple extents; and
    wherein the bitmap comprises a total number of bits equal to a total number of slices in the storage system.

2. The method according to claim 1, wherein the storage system is a storage system based on a Redundant Array of Independent Disks, and wherein selecting a group of storage devices each with a free extent from the multiple storage devices comprises:
 determining the number of storage devices in the group on the basis of configuration of the Redundant Array of Independent Disks; and
 selecting the group of storage devices on the basis of the number.

3. The method according to claim 1, wherein selecting the group of storage devices on the basis of the number comprises:
 determining the free device number of storage devices with free extents from the multiple storage devices; and
 in response to determining the free device number meets the number, selecting devices storage devices with free extents as the group of storage devices from the multiple storage.

4. The method according to claim 3, wherein selecting the group of storage devices on the basis of the number further comprises:
 moving, to the storage device, data in a first extent in a first storage device other than the storage device in response to determining the free device number does not meet the number;
 identifying the first extent as a free extent; and
 increasing the free device number.

5. The method according to claim 1, further comprising:
 moving, to the storage device, data in a first extent in a first storage device other than the storage device; and
 identifying the first extent as a free extent.

6. The method according to claim 1, further comprising:
 selecting a bitmap space for storing the bitmap from the allocated storage space; and
 in response to determining the user access is a write operation,
 writing target data specified by the write operation to the slice; and
 setting a bit in the bitmap, which is associated with the slice, to indicate data in the slice are non-zero.

7. The method according to claim 6, wherein
 a physical address of at least one part of a storage space in the new storage device has not been built an address mapping relationship with the storage system.

8. The method according to claim 7, further comprising:
 generating a slice access request for each slice among the multiple slices.

9. An apparatus for managing a storage system, comprising:
 at least one processor;
 a volatile memory; and
 a memory coupled to the at least one processor, the memory having instructions stored thereon, the instructions, when executed by the at least one processor, causing the apparatus to perform acts for managing a storage system, the storage system being associated with at least one part of multiple storage devices in a resource pool, at least one part of a storage space in a storage device among the multiple storage devices being inaccessible to the storage system, wherein the storage system is a storage system based on a Redundant Array of Independent Disks, the storage system comprising multiple slices, the acts including:
 identifying an extent within the at least one part of the storage space in the storage device that is inaccessible to the storage system as a free extent when the storage is added to the storage pool during an expansion of the storage pool, wherein the extent is inaccessible to the storage system because a mapping between the storage system and the storage device is not completely built,
 in response to receiving a slice access request for a slice among the multiple slices, determining an address range of the slice on the basis of a slice allocation table of the storage system,
 determining a virtual address range in the storage system on the basis of the address range of the slice, at least in part by
 determining an address of a bitmap associated with the address range of the slice, a corresponding bit in the bitmap indicating whether data in a corresponding slice among the multiple slices are zero, and
 determining the virtual address range on the basis of the address of the bitmap,
 selecting a group of storage devices each with a free extent from the multiple storage devices in response to determining that the virtual address range in the storage system as specified by an access request is inaccessible,
 mapping the virtual address range to a physical address range of the free extents in the group of storage devices, and
 allocating a storage space specified by the physical address range to the storage system and selecting a storage space for the slice from the allocated storage space,
 wherein each of the multiple slices comprises a storage unit having a size equal to a predefined value that is smaller than each of the multiple extents, and
 wherein the bitmap comprises a total number of bits equal to a total number of slices in the storage system.

10. The apparatus according to claim 9, wherein the storage system is a storage system based on a Redundant Array of Independent Disks, and wherein selecting a group of storage devices each with a free extent from the multiple storage devices comprises:
 determining the number of storage devices in the group on the basis of configuration of the Redundant Array of Independent Disks; and
 selecting the group of storage devices on the basis of the number.

11. The apparatus according to claim 9, wherein selecting the group of storage devices on the basis of the number comprises:
 determining the free device number of storage devices with free extents from the multiple storage devices; and
 in response to determining the free device number meets the number, selecting devices storage devices with free extents as the group of storage devices from the multiple storage.

12. The apparatus according to claim 11, wherein selecting the group of storage devices on the basis of the number further comprises:
 moving, to the storage device, data in a first extent in a first storage device other than the storage device in response to determining the free device number does not meet the number;
 identifying the first extent as a free extent; and
 increasing the free device number.

13. The apparatus according to claim 9, wherein the acts further comprise:
 moving, to the storage device, data in a first extent in a first storage device other than the storage device; and
 identifying the first extent as a free extent.

14. The apparatus according to claim 9, wherein the acts further comprise:

selecting a bitmap space for storing the bitmap from the allocated storage space; and in response to determining the user access is a write operation, writing target data specified by the write operation to the slice; and setting a bit in the bitmap, which is associated with the slice, to indicate data in the slice are non-zero.

15. The apparatus according to claim 14, wherein a physical address of at least one part of a storage space in the new storage device has not been built an address mapping relationship with the storage system.

16. The apparatus according to claim 15, wherein the acts further comprise:

generating a slice access request for each slice among the multiple slices.

17. A computer program product having a non-transitory computer readable medium which stores a set of instructions for managing a storage system, the storage system being associated with at least one part of multiple storage devices in a resource pool, at least one part of a storage space in a storage device among the multiple storage devices being inaccessible to the storage system, wherein the storage system is a storage system based on a Redundant Array of Independent Disks, the storage system comprising multiple slices; the set of instructions, when carried out by computerized circuitry, causing the computerized circuitry to perform a method of:

identifying an extent within the at least one part of the storage space in the storage device that is inaccessible to the storage system as a free extent when the storage device is added to the storage pool during an expansion of the storage pool, wherein the extent is inaccessible to the storage system because a mapping between the storage system and the storage device is not completely built;

in response to receiving a slice access request for a slice among the multiple slices, determining an address range of the slice on the basis of a slice allocation table of the storage system;

determining a virtual address range in the storage system on the basis of the address range of the slice, at least in part by determining an address of a bitmap associated with the address range of the slice, a corresponding bit in the bitmap indicating whether data in a corresponding slice among the multiple slices are zero, and determining the virtual address range on the basis of the address of the bitmap;

selecting a group of storage devices each with a free extent from the multiple storage devices in response to determining that the virtual address range in the storage system as specified by an access request is inaccessible;

mapping the virtual address range to a physical address range of the free extents in the group of storage devices; and allocating a storage space specified by the physical address range to the storage system and selecting a storage space for the slice from the allocated storage space;

wherein each of the multiple slices comprises a storage unit having a size equal to a predefined value that is smaller than each of the multiple extents; and wherein the bitmap comprises a total number of bits equal to a total number of slices in the storage system.

* * * * *